(12) United States Patent  (10) Patent No.: US 8,207,962 B2
Chen et al.  (45) Date of Patent: Jun. 26, 2012

(54) STEREO GRAPHICS SYSTEM BASED ON DEPTH-BASED IMAGE RENDERING AND PROCESSING METHOD THEREOF

(75) Inventors: Wan-Yu Chen, Taipei County (TW); Chih-Hui Kuo, Hsinchu (TW)

(73) Assignee: Mediatek Inc., Hsin-Chu (TW)

( * ) Notice: Subject to any disclaimer, the term of this patent is extended or adjusted under 35 U.S.C. 154(b) by 874 days.

(21) Appl. No.: 11/820,110

(22) Filed: Jun. 18, 2007

(65) Prior Publication Data

US 2008/0309666 A1 Dec. 18, 2008

(51) Int. Cl.
*G06T 15/00* (2011.01)
(52) U.S. Cl. ........................................ 345/419; 382/154
(58) Field of Classification Search .................. None
See application file for complete search history.

(56) References Cited

U.S. PATENT DOCUMENTS

| | | | | |
|---|---|---|---|---|
| 5,379,369 A | * | 1/1995 | Komma et al. | 345/419 |
| 5,530,774 A | * | 6/1996 | Fogel | 382/154 |
| 5,977,935 A | * | 11/1999 | Yasukawa et al. | 345/8 |
| 6,608,622 B1 | * | 8/2003 | Katayama et al. | 345/419 |
| 6,791,598 B1 | * | 9/2004 | Luken et al. | 348/36 |
| 6,985,162 B1 | | 1/2006 | Schinnerer et al. | |
| 7,616,885 B2 | * | 11/2009 | Chen et al. | 396/324 |
| 2004/0189796 A1 | | 9/2004 | Ho et al. | |

* cited by examiner

*Primary Examiner* — Said Broome
(74) *Attorney, Agent, or Firm* — Thomas|Kayden

(57) ABSTRACT

A stereo graphics system based on depth-based image rendering is disclosed. A master pipeline renders a first image from graphics data and derives a depth image relating to the first image. A rendering unit accesses the first image and the depth image from the master pipeline and renders a second image based on the first image and the depth image. First and second frame buffers retrieves and stores the first and second images, and a compositor accesses the first and second images from the frame buffers and combines the images to generate a resulting image.

15 Claims, 9 Drawing Sheets

STEREO GRAPHICS SYSTEM BASED ON DEPTH-BASED IMAGE RENDERING AND PROCESSING METHOD THEREOF

BACKGROUND OF THE INVENTION

1. Field of the Invention

The invention relates to stereo image rendering, and more particularly to a stereo graphics system based on depth-based image rendering and a processing method thereof.

2. Description of the Related Art

In general, three-dimensional (3D) graphics rendering may be performed with or without hardware 3D accelerators. In a stereo graphics application, however, a scene must be drawn twice, once for the left-eye view, and once for the right-eye view.

FIG. 1 illustrates the concept of stereo graphics and 3D vision. The bottom-left and bottom-right circles represent the position of a human's left eye and right eye respectively. "E" represents the eye separation distance between the two eyes. "P" represents the distance between projected views of the left and right eyes on the screen plane (Screen_Plane), indicating disparity in stereo video interpreted as the view depth in the human brain. $Z_i$ represents a view distance from the eyes to the screen plane. The top point illustrates an image point displayed on the screen plane. $Z_m$ represents a view depth, from the screen plane to the image point, bringing human 3D scene.

3D stereo graphics operations include 3D graphics rendering stereovision. A stereo graphics accelerator design comprises rendering of general 3D graphics and the stereo image display. Real-time 3D rendering can be achieved using graphics accelerators with 3D graphics chips such as 3Dlabs' GLINT lines. The key component in the design of a high-resolution stereo accelerator is the embedding of stereoscopic display functions in a graphics accelerator.

As described, stereoscopic graphics can only be viewed if both the left and right images, a stereo pair, are displayed simultaneously. Thus two double-buffered memories are required for stereoscopic display. That is, the frame buffer must be divided into four buffers which include a front left buffer, back left buffer, front right buffer, and back right buffer. Each individual double-buffered memory stores the information of either left-eye image or right-eye image. This frame buffer architecture organization is referred to as quad buffering.

In order to correctly view stereoscopic images on a display device, the left eye can only view left image output from the left buffer and the right eye can only view right image output from the right buffer. Each eye view should be refreshed often enough to avoid flickering. Time multiplexed stereo devices such as liquid crystal stereo glasses are typically used for viewing stereo image pairs.

Referring to NVIDIA 3D Stereo User's Guide, as shown in FIG. 2. Graphics application 17 determines a viewpoint and graphical data, graphics pipeline 23 renders an image based on the viewpoint and the graphical data, frame buffer 26 stores the rendered image, and display device 29 displays the rendered image. When the stereo mode is on, two camera viewpoint are rendered, which reduces the frame rate by at least half. The frame rate degradation may cause game unplayable or unacceptable display quality.

Further, U.S. Pat. No. 6,985,162 discloses systems and methods for rendering active stereo graphical data as passive stereo. When a stereo mode is activated, two camera views are rendered using multiple graphics pipelines. Master pipeline 55 receives graphical data and renders two-dimensional (2D) graphical data to frame buffer 65 and routes three-dimensional (3D) graphical data to slave pipelines 56-59, which render the 3D graphical data to frame buffers 66-69, respectively. The compositor 76 combine each of the data streams from frame buffers 65-69 into a single data stream that is provided to display device 83. Since there are more than one graphics pipeline unit employed for rendering left and right images, the frame rate is the same as the 2D display mode, however, hardware cost and bandwidth for exchanging graphics data are increased.

BRIEF SUMMARY OF THE INVENTION

Methods and systems for processing stereo graphics based on depth-based image rendering are provided. An exemplary embodiment of a method for processing stereo graphics comprises the following. A first image comprising the left eye image is rendered from graphics data, and a depth image relating to the first image is derived using a master pipeline. The first image is transmitted to a first frame buffer and a rendering unit while the depth image is transmitted to the rendering unit. The second image comprising the right eye image is rendered based on the first image and the depth image using the rendering unit. The second image is buffered in a second frame buffer. The first and second images are accessed by a compositor from the frame buffers and combine to generate a resulting image.

Another embodiment of a stereo graphics system comprises a master pipeline, a slave pipeline, a rendering unit, a first frame buffer, a second frame buffer, a second frame buffer, a third frame buffer, and a compositor. The master pipeline renders a first image and a depth image from graphics data. The slave pipeline renders a third image based on an object located farther away from the viewpoint of a user than a depth-based object of the first image. The rendering unit accesses the first image and the depth image from the master pipeline to render a second image. The compositor accesses the first, second, and third images from the frame buffers and combines the images to generate a resulting image.

Another embodiment of a stereo graphics system comprises a master pipeline, a first rendering unit, a second rendering unit, a first frame buffer, a second frame buffer, a third frame buffer, and a compositor. The master pipeline renders a first image and derives a depth image relating to the first image. The first rendering unit accesses the first image and the depth image from the master pipeline to render a second image. The second rendering unit renders a third image based on an object located near a depth-based object of the first image. The compositor accesses the first, second, and third images from the frame buffers and combines the images to generate a resulting image.

A detailed description is given in the following embodiments with reference to the accompanying drawings.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

The invention can be more fully understood by reading the subsequent detailed description and examples with references made to the accompanying drawings, wherein.

DETAILED DESCRIPTION OF THE INVENTION

Figure 1:
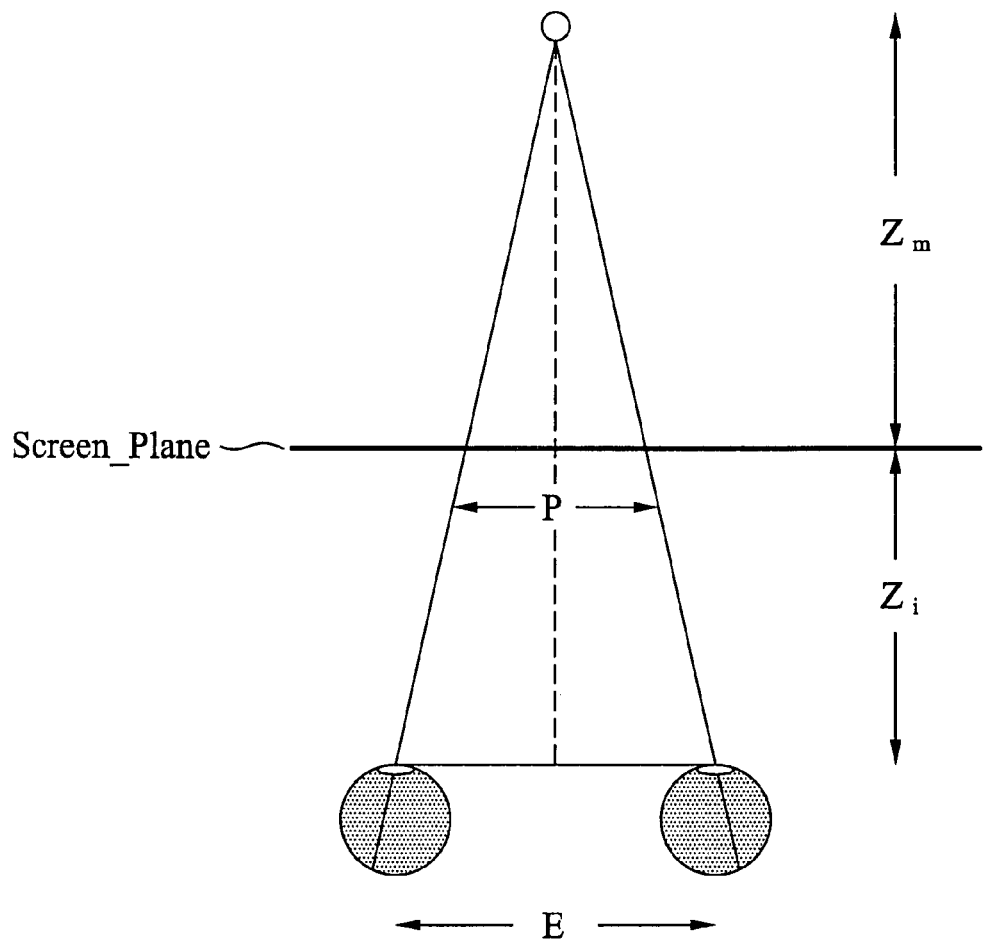
FIG. 1 illustrates a stereo image and depth of a 3D scene.
Figure 2:
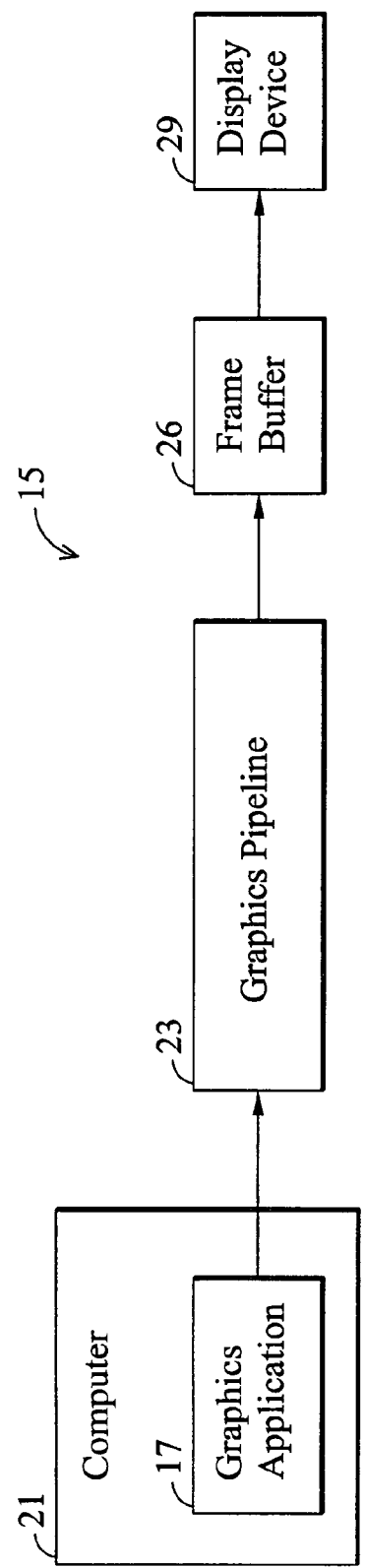
FIG. 2 is a block diagram illustrating a conventional graphical display system.
Figure 3:
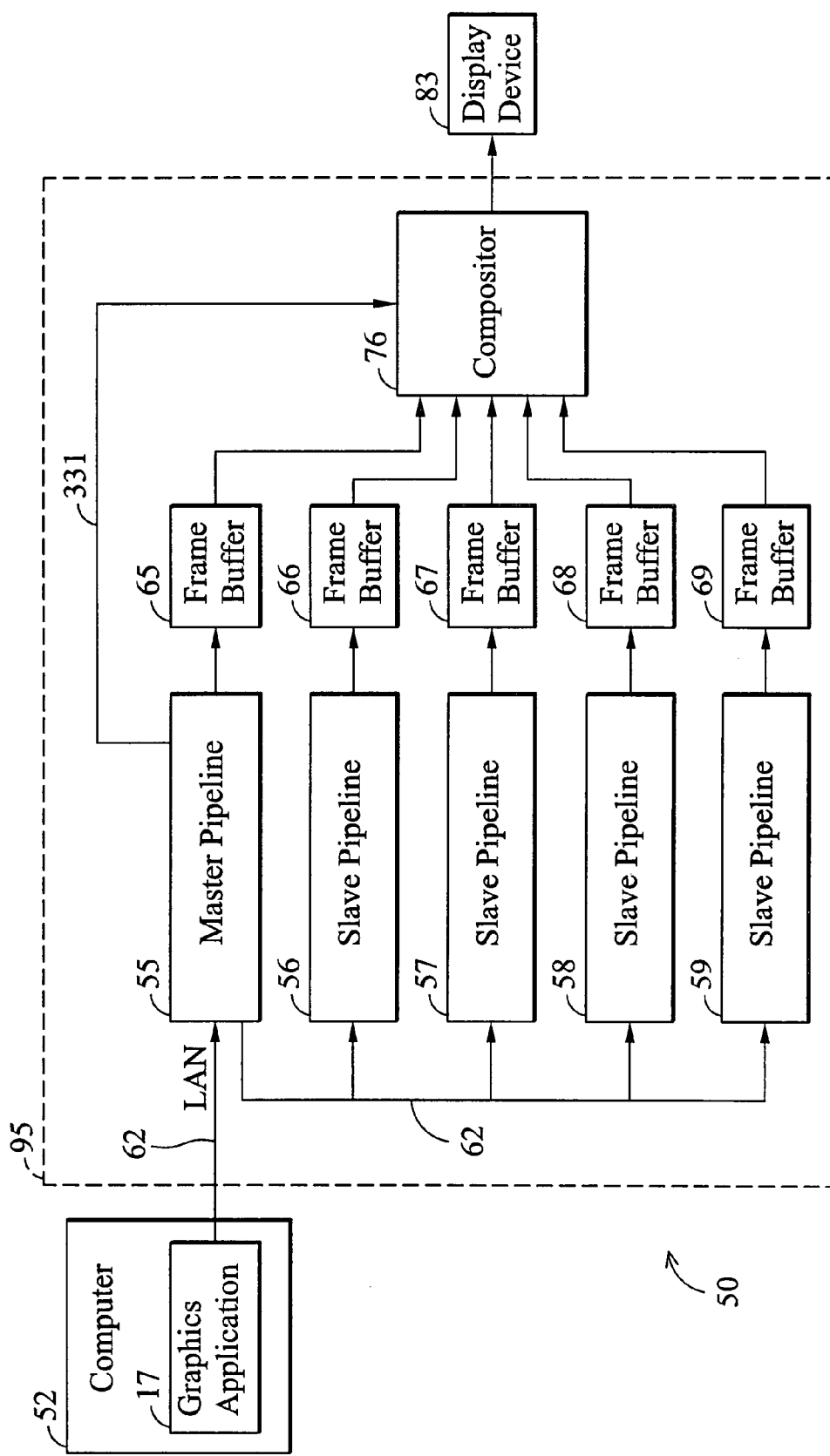
FIG. 3 is a block diagram illustrating another graphical display system.

Several exemplary embodiments of the invention are described with reference to FIGS. 4 through 7. It is to be understood that the following disclosure provides various embodiments as examples for implementing different features of the invention. Specific examples of components and arrangements are described in the following to simplify the present disclosure. These are, of course, merely examples and are not intended to be limited. In addition, the present disclosure may repeat reference numerals and/or letters in the various examples. This repetition is for the purpose of simplicity and clarity and does not in itself dictate a relationship between the various described embodiments and/or configurations.

Figure 8:
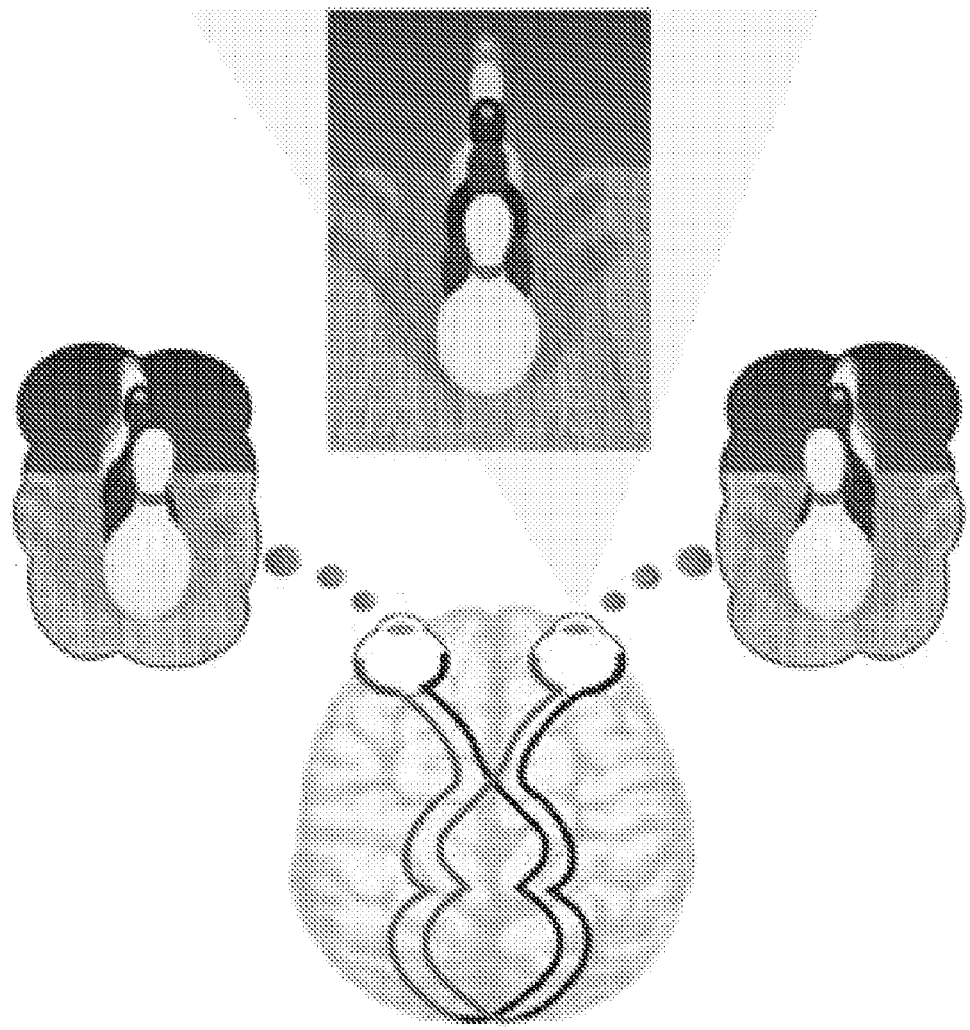
FIG. 8 illustrates relative positions for the left and right views generated by human optic nerves.
Figure 9:
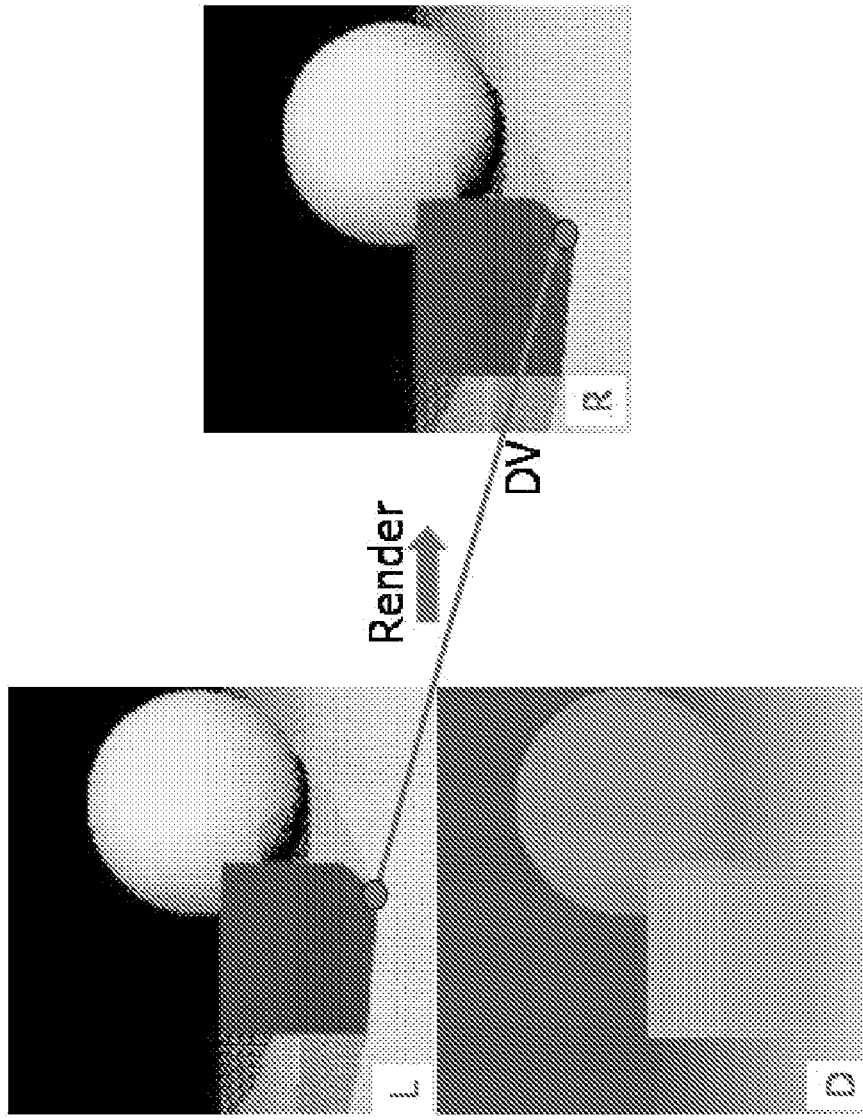
FIG. 9 illustrates an embodiment of a depth-based image rendering, rendering the right view image according to the left view image based on the optic nerve rendering.

FIG. 8 illustrates relative positions for the left and right views generated by human optic nerves. FIG. 9 illustrates an embodiment of a depth-based image rendering, rendering the right view image according to the left view image based on the optic nerve rendering. Referring to FIG. 8, the left view and right view are relative and depth is the key relationship. Thus, referring to FIG. 9, the "L" image represents the left view and is first rendered and the depth image relating to the left view is calculated. The right view can be rendered based on the left view and the depth image. Such rendering is similar to disparity vector (DV) compensation.

Figure 4:
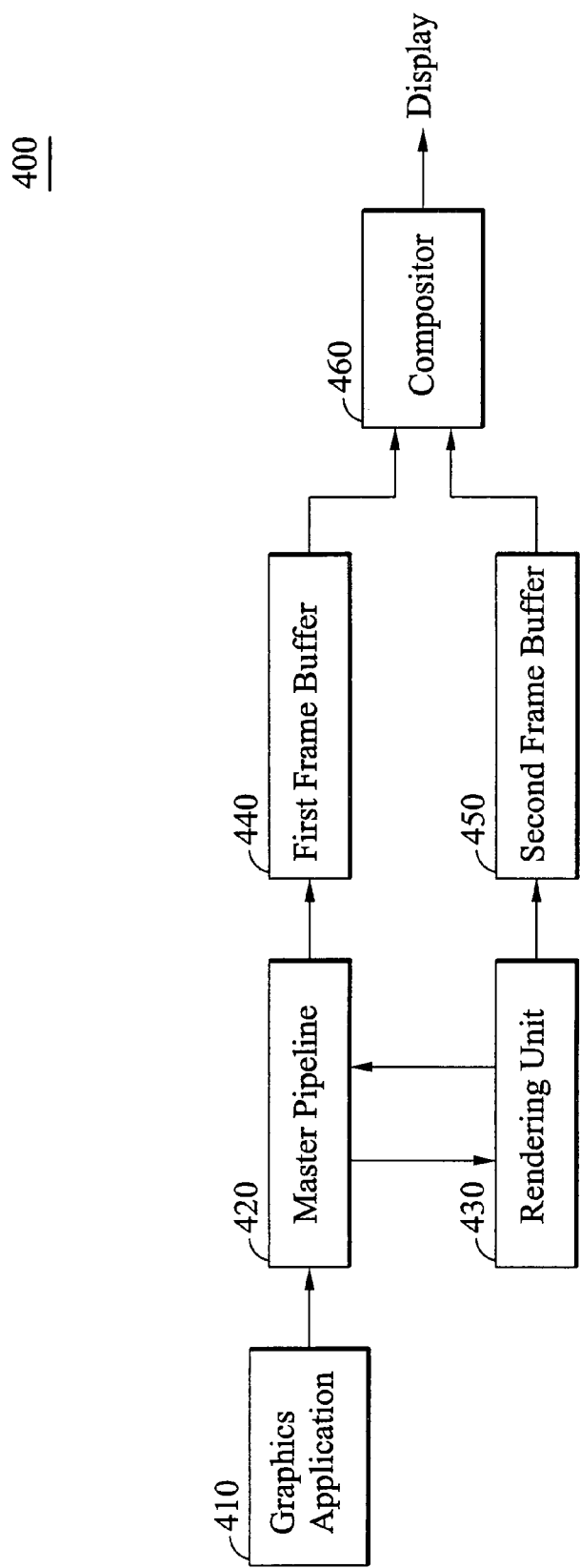
FIG. 4 is a schematic view of an embodiment of a stereo graphics system based on depth-based image rendering.

FIG. 4 is a schematic view of an embodiment of a stereo graphics system based on depth-based image rendering.

Stereo graphics system 400 comprises a graphics application 410, a master pipeline 420, a rendering unit 430, a first frame buffer 440, a second frame buffer 450, and a compositor 460. Graphics application 410 provides graphics data to master pipeline 420, and master pipeline 420 renders the left image and derives a depth image relating to the left image. The left image is temporarily stored in first frame buffer 440. Further, master pipeline 420 transmits the left image and the depth image to rendering unit 430. Rendering unit 430 renders the right image based on the left image and the depth image and buffers the right image in second frame buffer 450. Compositor 460 retrieves the left and right images from first and second frame buffers 440 and 450, combining both images to generate a resulting image to be displayed on a display device.

As described, the right image can be derived from the left image based on the depth information. As shown in FIG. 8, however, there are occluded areas due to different views of the left and right eyes. If an accurate resulting image is desired, rendering unit 430 draws a bounding box of occluded area and transmits the bounding box to master pipeline 420. Master pipeline 420 then renders the occluded area of the right images based on the bounding box. The occluded area of the right image can also be rendered by interpolation or extrapolation to improve the resulting image quality.

Figure 5:
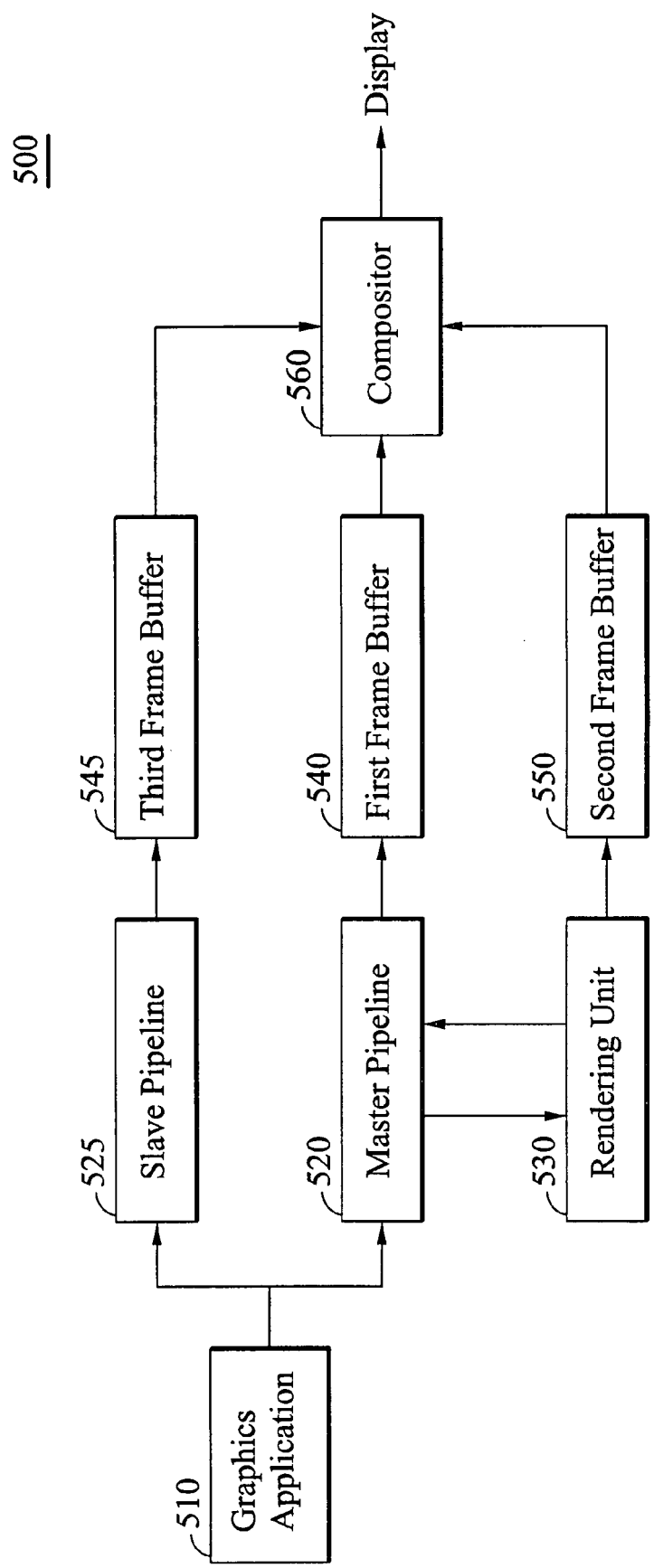
FIG. 5 illustrates another embodiment of a stereo graphics system based on depth-based image rendering using at least two pipelines.

FIG. 5 illustrates another embodiment of a stereo graphics system based on depth-based image rendering using at least two pipelines.

Stereo graphics system 500 comprises a graphics application 510, a master pipeline 520, a slave pipeline 525, a rendering unit 530, a first frame buffer 540, a second frame buffer 550, a third frame buffer 545, and a compositor 560. Master pipeline 520 retrieves graphics data from graphics application 510, and it renders the left image and calculates a depth image relating to the left image. The left image is then buffered in first frame buffer 540. If an object in the left image also requires rendering but is located farther from a viewer than a depth-based object of the left image, slave pipeline 525 renders the object and transmits the object image to third frame buffer 545. Further, master pipeline 520 transmits the left image and the depth image to rendering unit 530. Rendering unit 530 renders the right image based on the left image and the depth image and transmits the right image to second frame buffer 550. Compositor 560 retrieves the left and right images from first and second frame buffers 540 and 550 and the object image from third frame buffer 545 and merges the images to generate a resulting image to be displayed on a display device.

Figure 6:
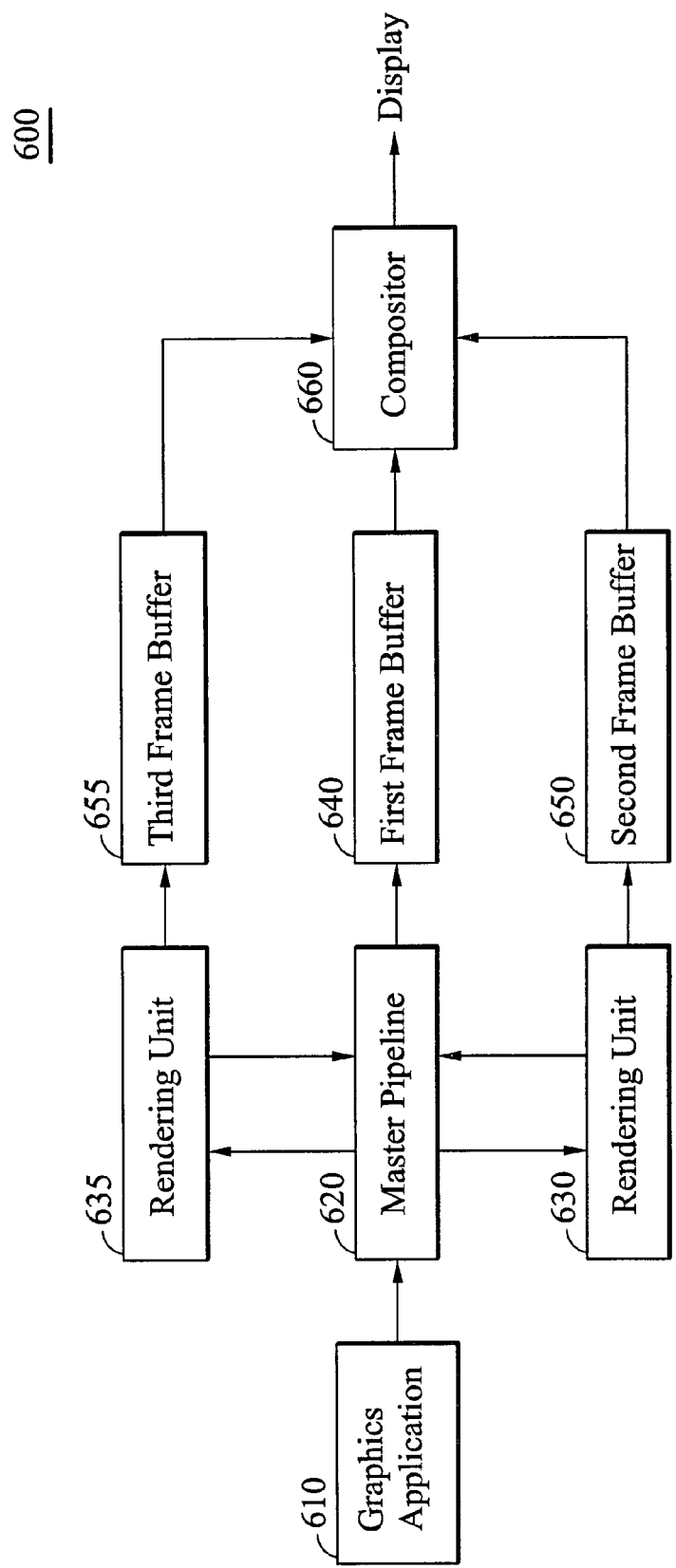
FIG. 6 illustrates another embodiment of a stereo graphics system based on depth-based image rendering using at least two rendering units.

FIG. 6 illustrates another embodiment of a stereo graphics system based on depth-based image rendering using at least two rendering units.

Stereo graphics system 600 comprises a graphics application 610, a master pipeline 620, rendering units 630 and 635, a first frame buffer 640, a second frame buffer 650, a third frame buffer 655, and a compositor 660. Master pipeline 620 obtains graphics data from graphics application 610, renders the left image from the graphics data, and derives a depth image relating to the left image and transmits the left image to first frame buffer 640. If an object in the left image also requires rendering and is located near a depth-based object of the left image, rendering units 635 renders the object and transmits the object image to third frame buffer 655. Further, master pipeline 620 transmits the left image and the depth image to rendering unit 630 to render the right image, and the right image is temporarily stored in second frame buffer 650. Compositor 660 retrieves the left and right images from first and second frame buffers 640 and 650 and the object image from third frame buffer 655 and merges the images to generate a resulting image to be displayed on a display device.

In some other embodiments, the stereo graphics system generates a resulting image based on more than two views, for examples, three views including left, right, and centre views. The image of the centre view may be obtained by an additional pipeline, similar to the structure as shown in FIG. 5, or an additional rendering unit, similar to the structure as shown in FIG. 6.

Figure 7:
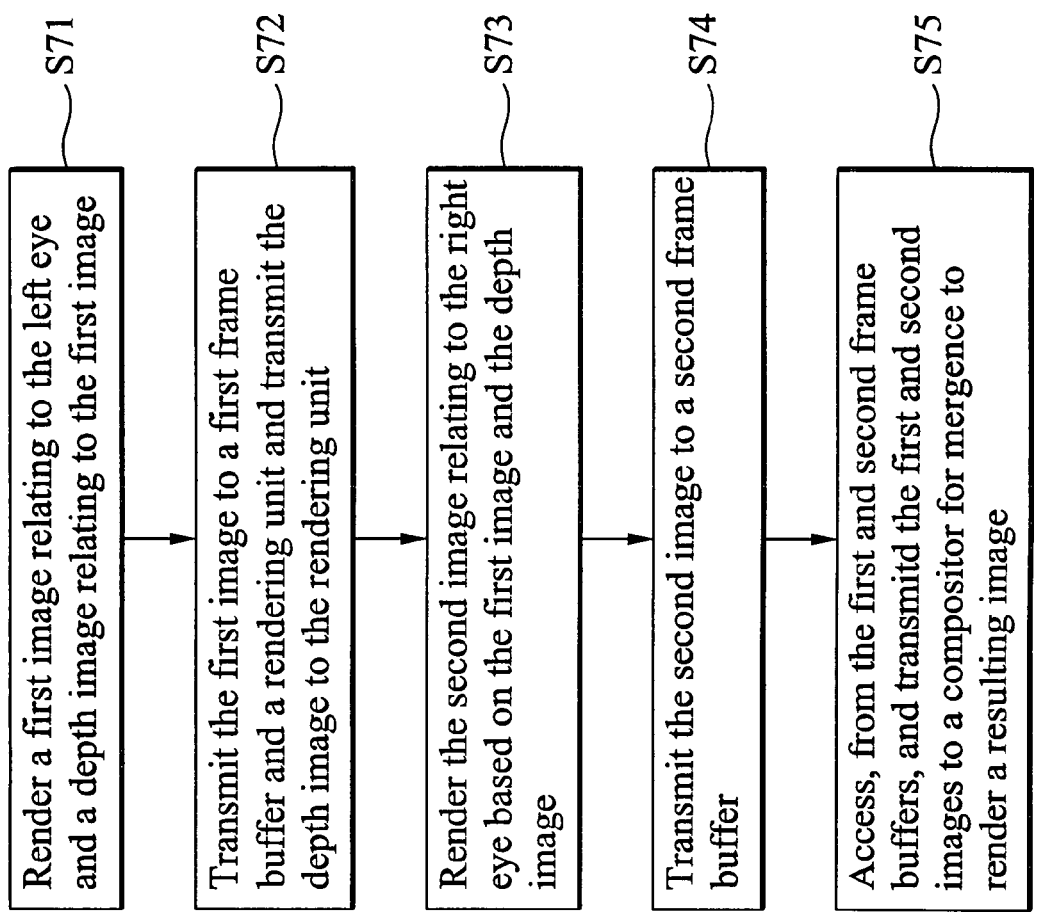
FIG. 7 is a flowchart of an embodiment of processing method for a stereo graphics system based on depth-based image rendering.

FIG. 7 is a flowchart of an embodiment of a stereo graphics processing method.

When a graphics application is executed, a first image relating to the left eye is rendered and a depth image relating to the first image is derived (step S71). The first image is transmitted to a first frame buffer and a rendering unit while the depth image is transmitted to the rendering unit (step S72). The second image relating to the right eye is calculated based on the first image and the depth image (step S73). Next, the second image is transmitted to a second frame buffer (step S74). The first and second images are accessed from the first and second frame buffers and combined to generate a resulting image (step S75), and the resulting image can be displayed on a display device.

An embodiment of a stereo graphics system based on depth-based image rendering and the processing method therefore can be applied to graphics cards or any product supporting stereo graphics. Embodiments of the proposed stereo graphics system and method accelerate image synthesis of another viewpoint by utilizing depth information. The frame rate for complex scenes can maintain at a rate almost the same when stereo mode is activated while only employing one graphics pipeline unit.

Methods and systems of the present disclosure, or certain aspects or portions of embodiments thereof, may take the form of program code (i.e., instructions) embodied in media, such as CD-ROMS, hard drives, firmware, or any other machine-readable storage medium, wherein, when the program code is loaded into and executed by a machine, such as a computer, the machine becomes an apparatus for practicing embodiments of the disclosure. The methods and apparatus of the present disclosure may also be embodied in the form of program code transmitted over some transmission medium, such as electrical wiring or cabling, through fiber optics, or via any other form of transmission, wherein, when the program code is received and loaded into and executed by a machine, such as a computer, the machine becomes an apparatus for practicing and embodiment of the disclosure. When implemented on a general-purpose processor, the program code combines with the processor to provide a unique apparatus that operates analogously to specific logic circuits.

While the invention has been described by way of example and in terms of the preferred embodiments, it is to be understood that the invention is not limited to the disclosed embodiments. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A stereo graphics system, comprising:
    a master pipeline, receiving graphics data, rendering a first image, and deriving a depth image relating to the first image triggered by a graphics application;
    a rendering unit, coupled to the master pipeline, accessing the first image and the depth image from the master pipeline and rendering a second image for another view derived from the first image and the depth image;
    a first frame buffer, coupled to the master pipeline, retrieving and storing the first image;
    a second frame buffer, coupled to the rendering unit, retrieving and storing the second image; and
    a compositor, coupled to the first and second frame buffers, accessing the first and second images from the first and second frame buffers and combine the images to generate a resulting image,
    wherein the rendering unit draws a bounding box and transmits the bounding box to the master pipeline if an occluded area for the first and second images is detected, and the master pipeline renders the occluded area based on the bounding box.

2. The stereo graphics system as claimed in claim 1, wherein the first image is one of a left-eye image and a right-eye image, and the second image is the other one of the left-eye image and the right-eye image.

3. The stereo graphics system as claimed in claim 1, wherein the occluded area is rendered by interpolation.

4. A stereo graphics system, comprising:
    a master pipeline, receiving graphics data, rendering a first image, and deriving a depth image relating to the first image triggered by a graphics application;
    a rendering unit, coupled to the master pipeline, accessing the first image and the depth image from the master pipeline and rendering a second image for another view derived from the first image and the depth image;
    a first frame buffer, coupled to the master pipeline, retrieving and storing the first image;
    a second frame buffer, coupled to the rendering unit, retrieving and storing the second image;
    a compositor, coupled to the first and second frame buffers, accessing the first and second images from the first and second frame buffers and combine the images to generate a resulting image;
    a second rendering unit, accessing the first image and the depth image from the master pipeline, and rendering a third image; and
    a third frame buffer, coupled to the second rendering unit, retrieving and storing the third image;
    wherein the compositor generates the resulting image by combining the first, second, and third images.

5. A stereo graphics system, comprising:
    a master pipeline, receiving graphics data, rendering a first image, and deriving a depth image relating to the first image triggered by a graphics application;
    a rendering unit, coupled to the master pipeline, accessing the first image and the depth image from the master pipeline and rendering a second image for another view derived from the first image and the depth image;
    a first frame buffer, coupled to the master pipeline, retrieving and storing the first image;
    a second frame buffer, coupled to the rendering unit, retrieving and storing the second image;
    a compositor, coupled to the first and second frame buffers, accessing the first and second images from the first and second frame buffers and combine the images to generate a resulting image;
    a slave pipeline, receiving the graphics data and rendering a third image; and
    a third frame buffer, retrieving and storing the third image;
    wherein the compositor generates the resulting image by combining the first, second, and third images.

6. A computer-implemented method for processing stereo graphics, comprising the steps of:
    rendering, on the computer, a first image from graphics data and deriving a depth image relating to the first image triggered by a graphics application;
    buffering, in the computer, the first image;
    rendering, on the computer, the second image for another view derived from the first image and the depth image;
    buffering, in the computer, the second image;
    accessing, in the computer, the buffered first and second images and combine the images to generate a resulting image,
    drawing, on the computer, a bounding box if an occluded area for the first and second images is detected; and
    rendering, on the computer, the occluded area based on the bounding box.

7. The computer-implemented method for processing stereo graphics as claimed in claim 4,
    wherein the first image is one of a left-eye image and a right-eye image, and the second image is the other one of the left-eye image and the right-eye image.

8. The computer-implemented method for processing stereo graphics as claimed in claim 4, wherein the occluded area is rendered by interpolation.

9. A computer-implemented method for processing stereo graphics, comprising the steps of:
- rendering, on the computer, a first image from graphics data and deriving a depth image relating to the first image triggered by a graphics application;
- buffering, in the computer, the first image;
- rendering, on the computer, the second image for another view derived from the first image and the depth image;
- buffering, in the computer, the second image;
- accessing, in the computer, the buffered first and second images and combine the images to generate a resulting image,
- accessing, in the computer, the first image and the depth image for rendering a third image; and
- buffering, in the computer, the third image;
- wherein the resulting image is generated by combining the first, second, and third images.

10. The computer-implemented method for processing stereo graphics as claimed in claim 7, wherein the third image is rendered based on an object located near a depth-based object of the first image.

11. A computer-implemented method for processing stereo graphics, comprising the steps of:
- rendering, on the computer, a first image from graphics data and deriving a depth image relating to the first image triggered by a graphics application;
- buffering, in the computer, the first image;
- rendering, on the computer, the second image for another view derived from the first image and the depth image;
- buffering, in the computer, the second image;
- accessing, in the computer, the buffered first and second images and combine the images to generate a resulting image;
- receiving, in the computer, the graphics data and rendering a third image; and
- buffering, in the computer, the third image;
- wherein the resulting image is generated by combining the first, second, and third images.

12. The computer-implemented method for processing stereo graphics as claimed in claim 11, wherein the third image is rendered based on an object located near a depth-based object of the first image.

13. A non-transitory computer-readable storage medium storing a computer program providing a method for processing stereo graphics, comprising using a computer to perform the steps of:
- rendering a first image from graphics data and deriving a depth image relating to the first image triggered by a graphics application;
- buffering the first image;
- rendering the second image derived from the first image and the depth image;
- buffering the second image;
- accessing the first and second images and combining the images to generate a resulting image;
- drawing a bounding box if an occluded area for the first and second images is detected; and
- rendering the occluded area based on the bounding box.

14. The non-transitory computer-readable storage medium as claimed in claim 10, further comprising:
- drawing a bounding box if an occluded area for the first and second images is detected; and
- rendering the occluded area based on the bounding box.

15. The non-transitory computer-readable storage medium as claimed in claim 10, wherein the occluded area is rendered by interpolation.

* * * * *